Aug. 5, 1969    F. MASSA    3,460,061
ELECTROACOUSTIC TRANSDUCER WITH IMPROVED SHOCK RESISTANCE
Filed Oct. 7, 1965

United States Patent Office 3,460,061
Patented Aug. 5, 1969

3,460,061
ELECTROACOUSTIC TRANSDUCER WITH IMPROVED SHOCK RESISTANCE
Frank Massa, Cohasset, Mass., assignor to Dynamics Corporation of America, Massa Division, Hingham, Mass.
Filed Oct. 7, 1965, Ser. No. 493,806
Int. Cl. H04b 13/00
U.S. Cl. 340—8                                                15 Claims

ABSTRACT OF THE DISCLOSURE

In an underwater transducer, a piezoelectric element is coupled to a vibratile plate via a mechanical coupling member. This member transmits axial vibrations from the piezoelectric element to the vibratile plate while preventing the transmission of the flexural vibrations from the plate to the element. This way, the element is protected against bending stresses as a result of mechanical shock.

---

My invention is concerned with improvements in electroacoustic transducers and, particularly, in the improvement of the resistance of the transducer to mechanical shock as well as the improvement in the ruggedness of the transducer to operate at very high power levels. The type of transducer to which this invention is particularly concerned is one in which a vibrating transducer element is coupled to a diaphragm such that mechanical vibrations are imparted to the diaphragm, which diaphragm in turn generates acoustic power in the fluid within which the diaphragm is immersed. The transducer may be one for generating acoustic energy in gasses or in liquids.

The usual manner which is generally adopted for coupling a vibratory force generating structure to a diaphragm is to rigidly attach the electromechanical transducer element directly to the diaphragm surface. An example of one type of transducer with which this invention is concerned is illustrated in U.S. Patent No. 3,199,071. I have found that when such a transducer operates at the higher frequencies, the diaphragm does not move with uniform displacement over its entire surface but that the outer periphery of the diaphragm moves at somewhat greater amplitude than the center portion. Therefore, when such a structure is driven at very high amplitudes, an appreciable amount of curvature will be introduced in the surface of the diaphragm to which the transducer material is attached, and at sufficiently high amplitudes of vibration, the amount of curvature which is produced will become sufficient to cause failure of the bond or of the transducer material itself near the region where the transducer element is attached to the diaphragm. When such a transducer is subjected to a high explosive blast pressure in its vicinity, the transient shock pressures will excite the diaphragm and its assembled elements at its natural resonant frequency, and at sufficiently high blast pressures, the amplitude of vibration of the diaphragm may become large enough so that the curvature of its surface becomes sufficient to cause physical destruction at the junction point of the transducer material to the diaphragm.

My invention is particularly useful in connection with sonar transducers which are required to have a high reliability of operation at high power levels and are also required to have a high degree of resistance to underwater explosion, such as may be encountered during combat conditions when a depth charge may explode in the vicinity of the transducer and the transducer is required to maintain satisfactory operation.

It is the general object of my invention to improve the shock resistance characteristics of an electroacoustic transducer.

Another object of my invention is to provide a mechanical coupling member between a vibrating electromechanical transducer and a driven diaphragm such that flexural modes of vibration of the diaphragm will not be coupled directly to the surface of the electromechanical transducer.

It is a further object of my invention to provide a ring-like coupling member to transmit a vibratory motion from a vibrating electromechanical structure to a driven diaphragm whereby a circular line contact is established between the diaphragm and the force transmitting element.

Still another object of my invention is to provire a mechanical force coupling element between an electromechanical vibrating structure and a diaphragm in which the coupling member will isolate the transmission of flexural modes between the diaphragm surface and the electromechanical vibrating structure.

The novel features which I consider characteristic of my invention are set forth with particularity in the appended claims. The invention itself, however, both as to its organization and method of operation as well as its advantages thereof will best be understood from the following description of several embodiments thereof when read in connection with the accompanying drawings, in which:

Figure 1:
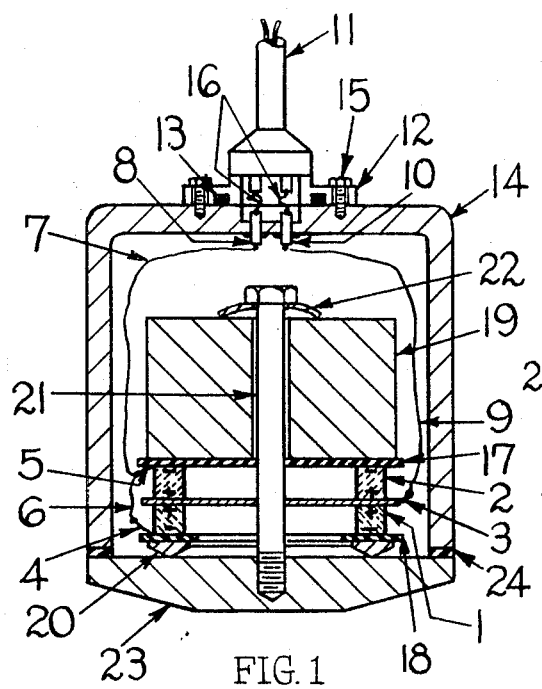
FIG. 1 is a vertical cross-section taken through a transducer which incorporates one form of my invention.
Figure 2:
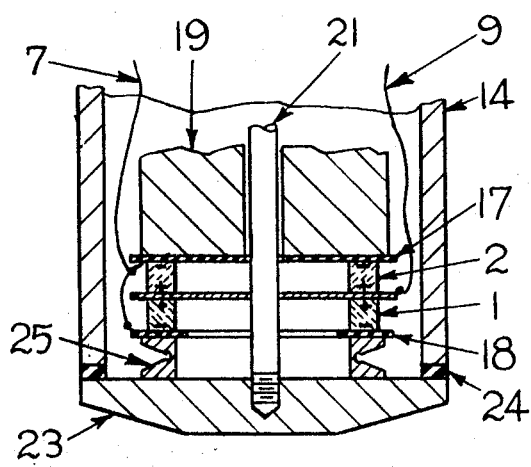
FIG. 2 is a partial vertical cross-section similar to FIG. 1 showing a modified mechanical coupling member between the diaphragm and the electromechanical transducer element which prevents flexural modes set up in the diaphragm from being transmitted to the surface of the transducer material.

Referring more particular to FIG. 1, 1 and 2 represent a pair of polarized ceramic rings such as polarized barium titanate or lead zirconate titanate. The rings are polarized along the axial dimension with the plus and minus polarities being arranged as illustrated in FIG. 1, (i.e. the ring surfaces touching the electrode 3 are most positive and the surfaces touching the washers 17, 18 are most negative). Between the two positive electrode surfaces is cemented an electrically conducting electrode 3. Similar electrodes 4 and 5 are cemented to the negative electrode surfaces of the polarized rings. The common negative electrodes 4 and 5 are connected together with a conductor 6 and the common terminal is in turn connected with a conductor 7 to the insulated terminal 8. The positive terminal 3 is connected by means of the conductor 9 to the insulated terminal 10. A rubber covered 2-conductor cable 11 is molded to a metallic flange type structure 12 which contains a groove with O-ring 13 to permit a water seal when it is attached to the housing 14 by means of the bolts 15. The flange piece 12 is recessed near its center section to provide room for the conductors 16 to be connected to the terminals 8 and 10. The assembled polarized ceramic rings 1 and 2 are bonded by means of a suitable cement such as epoxy to insulating washers 17 and 18. A massive weight member 19 is bonded to the opposite face of washer 17 and a special ring member 20, which will be more completely described, is bonded to the opposite face of insulating washer 18, as shown. A bolt 21 and a high pressure spring 22 is employed to fasten the assembly of elements shown in FIG. 1 to the inside plane surface of the diaphragm 23. The compressive stress in the bolt 21, which is controlled by the design of the spring member 22, is made greater than the peak force which is generated by the vibrating ceramic rings 1 and 2 when driven at maximum power input. A flexible waterproof gasket 24 is bonded with a suitable cement, such as epoxy, between the outer periphery of diaphragm 23 and the peripheral end of the housing 14. The transducer structure just described in FIG. 1 can be submerged under water and will operate as an inertially driven structure in which the oscillatory forces generated by the ceramic rings will set up vibrations in the diaphragm 23 which in turn will radiate acoustic energy into the water. To secure best operating characteristics, the compliance of the rubber gasket 24 is chosen such that the resonant frequency of the rear housing 14, in combination with the gasket 24, lies below the desired operating frequency of the piston 23. By this adjustment, the rear housing will tend to remain stationary at the operating frequency of the diaphragm and, therefore, radiation will take place only from the diaphragm, as is desired.

In order that efficient displacement of the diaphragm be achieved, it is desirable that the mass of the weight member 19 be made greater than the mass of diaphragm 23. An important element in FIG. 1 is the coupling ring member 20 which has a triangular cross-section, as illustrated, and transmits the driving force from the ceramic assembly over a circular line contact to the diaphragm 23. If the ring member 20 is eliminated and the flat surface 18 is directly coupled to the diaphragm, I have found that the ceramic rings are fractured under very high amplitudes of vibration such as occur when very high acoustic power is radiated and such as occur when a high transient shock wave is imposed on the transducer such as results in the vicinity of an underwater explosion. By using the triangular shaped ring 20, which effectively drives the diaphragm through a line contact, any flexural vibration of the diaphragm is not transmitted through the line contact, and I have found that the transducer is not damaged by exposure to high shock waves such as cause destructive damage in the absence of ring 20.

FIG. 2 illustrates the same transducer shown in FIG. 1 in which all the corresponding parts are similarly indicated. The only difference in FIG. 2 is that the adaptor ring 25 replaces the ring 20 of FIG. 1. The element 25, which is shown in cross-sectional view in FIG. 2, is a cylindrical ring having a pair of parallel plane surfaces and a notched groove turned into the outer periphery, as illustrated. During flexural vibration of the diaphragm 23 the thin undercut portion near the center of the member 25 acts as a hinge which permits the diaphragm surface directly attached to one side of ring 25 to bend in a curve and yet the bending is not transmitted to the surface of the ceramic element 1 which is bonded to the opposite face of member 25.

Figure 3:
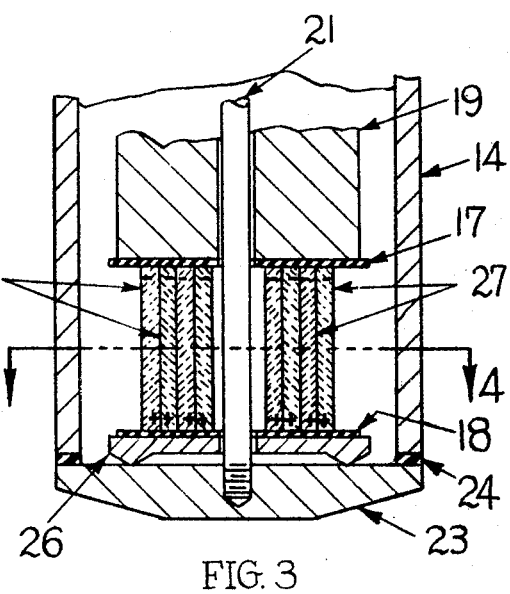
FIG. 3 is a partial vertical section of a transducer structure similar to FIG. 1 except that a rectangular assembly of piezoelectric plates are used as the electromechanical transducer material, and illustrates a modified form of coupling member which achieves the same isolation as is obtained in FIG. 1 for the ring type transducer elements.
Figure 4:
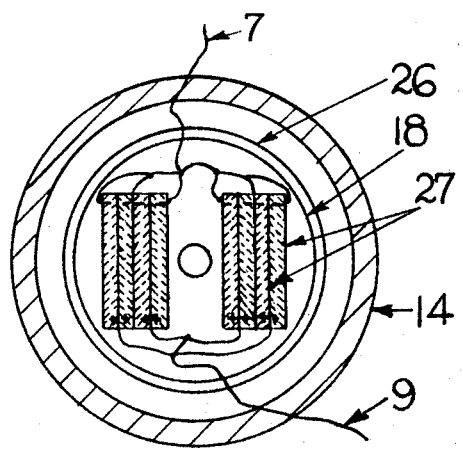
FIG. 4 is a view taken along the line 4—4 of FIG. 3. The view 4—4 corresponds to a section taken through a complete transducer.

FIGS. 3 and 4 illustrate the embodiment of the principle of my invention in an electroacoustic transducer which has as its active element a rectangular stack of piezoelectric crystal plates. In FIGS. 3 and 4, an assembly of 45° Z-cut ADP crystal plates with their positive and negative electrode surfaces connected as illustrated will generate electromechanical oscillatory forces along the vertical axis of the plates when an alternating signal is applied to the electrode surfaces. FIG. 4 illustrates the common connection to the minus electrodes by means of a conductor 7 and a common connection to the positive electrodes by means of the conductor 9. The conductors 7 and 9 of FIG. 4 are identical to the conductors 7 and 9 in FIG. 1 and are connected to the electrical terminals and cable in the same manner as described in connection with FIG. 1. The operation of piezoelectric crystals and the manner of connecting them in groups for transducer applications is well known to anyone skilled in the art and, therefore, no further description will be made in this specification. The purpose of this invention is not specifically concerned with piezoelectrical crystal plates but it is concerned with the coupling means between the forces generated by the crystal plates or other transducer means and the driven diaphragm. In order to isolate the flexural modes of vibration of the piston 23 for the type of transducer illustrated in FIG. 3, I employ the member 26, which is essentially a flat disc having a plane area to which the insulating washer 18 is bonded and to which washer the crystal plates 27 are also bonded, as illustrated in FIG. 3. Near the periphery of the disc 26 is a triangular shaped ring surface, as illustrated in the cross-sectional view of FIG. 3. This structure achieves the same circular line contact between the diaphragm and the electromechanical force generating element as was achieved by the ring 20 in FIG. 1. The design of the structure 26 provides a flat area to which the crystal plates may be attached as compared with the ring type structure of FIG. 1 which was suited to the cylindrical ceramic rings 1 and 2.

Although it is not absolutely essential, I found it particularly desirable to make the line contact surface of elements 20 and 26 with a slight radius of the order of $\frac{1}{64}$", and it is also desirable that the material used for parts 20 and 26 be harder than the material employed for the piston 23. During assembly of the transducer structure I also found it desirable, although not absolutely necessary, to apply an auxiliary force to the rear mass member 19 which exceeds by several times the magnitude of the force which is exerted by the bolt 21. By introducing this procedure during the assembly of the transducer, I am able to force the relatively fine edge of elements 20 or 26 into the surface of the plate 23 so that I provide a perfect seating contact surface around the entire periphery of the mating edge. This procedure results in extremely uniform operational characteristics and particularly the resonant frequency of the transducer assembly remains stable and unaffected by long periods of high power operation.

Although I have chosen only a few specific examples to illustrate the basic principle of my invention, it will be obvious to those skilled in the art that numerous departures may be made from the details shown, and I, therefore, desire that my invention shall not be limited except insofar as is made necessary by the prior art and by the spirit of the appended claims.

I claim as my invention:

1. In combination in an electroacoustic transducer, a transducer element capable of converting alternating current to mechanical vibratory forces, a vibratile diaphragm comprising a rigid plate member, coupling means for transmitting said mechanical vibratory forces to said vibratile diaphragm, said coupling means being shaped and dimensioned so that linear translatory forces are transmitted with negligible attenuation from said transducer element to said vibratile diaphragm, and flexural vibrations of the diaphragm surface are attenuated by said coupling means so that said flexual vibrations do not reach the transducer element.

2. In combination in an electroacoustic transducer, a transducer element capable of converting alternating current to mechanical vibratory forces, a vibratile diaphragm, means for coupling said mechanical vibratory forces to said vibratile diaphragm, said coupling means characterized in that linear translatory forces are transmitted with negligible attenuation between said transducer element and said vibratile diaphragm, and further characterized in that flexural vibrations of the diaphragm surface are attenuated by said coupling means to prevent them from reaching the transducer element, said coupling means comprises a structure having a flat plane surface on one side and a circular line edge on the opposite side, and still further characterized in that said flat plane surface is attached to said transducer element and said circular line edge is in contact with the surface of said vibratile diaphragm.

3. In combination in an electroacoustic transducer, a transducer element capable of converting alternating current to mechanical vibratory forces, a vibratile diaphragm, means for coupling said mechanical vibratory forces to said vibratile diaphragm, said coupling means characterized in that linear translatory forces are transmitted with negligible attenuation between said transducer element and said vibratile diaphragm, and further characterized in that flexural vibrations of the diaphragm surface are attenuated by said coupling means to prevent them from reaching the transducer element, said coupling means comprises a structure having a flat plane surface on one side and a flat plane parallel annular-shaped surface on the opposite side, and further characterized in that said annular-shaped surface is reduced in area in the region between said opposite parallel surfaces.

4. The invention set forth in claim 2, further characterized in that said coupling means is fabricated of a material which is harder than the material used in fabricating the vibratile diaphragm.

5. In combination in an electroacoustic transducer, transducer means having a pair of opposite parallel plane surfaces, electrical conductor means connected to said transducer means, said transducer means characterized in that alternating current applied to said conductor means establishes mechanical vibrations in said transducer means at right angles to said parallel plane surfaces, a vibratile diaphragm characterized as a rigid vibratile plate under its normal operating conditions and having a plane surface, a weight member having a plane surface, a coupling member having a plane surface, means for attaching said plane surface of said weight member to one of said parallel plane surfaces of said transducer means, means for attaching the opposite parallel plane surface of said transducer means to the plane surface of said coupling means, fastening means for securing said assembled weight member, transducer means and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means.

6. In combination in an electroacoustic transducer, transducer means having a pair of opposite parallel plane surfaces, electrical conductor means connected to said transducer means, said transducer means characterized in that alternating current applied to said conductor means establishes mechanical vibrations in said transducer means at right angles to said parallel plane surfaces, a vibratile diaphragm having a plane surface, a weight member having a plane surface, a coupling member having a plane surface, means for attaching said plane surface of said weight member to one of said parallel plane surfaces of said transducer means, means for attaching the opposite parallel plane surface of said transducer means to the plane surface of said coupling means, fastening means for securing said assembled weight member, transducer means and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, and means whereby said fastening means applies a compressive force to the assembled elements which is greater than the peak oscillatory force generated by the transducer element during operation of the transducer at maximum power.

7. In combination in an electroacoustic transducer, transducer means having a pair of opposite parallel plane surfaces, electrical conductor means connected to said transducer means, said transducer means characterized in that alternating current applied to said conductor means establishes mechanical vibrations in said transducer means at right angles to said parallel plane surfaces, a vibratile diaphragm having a plane surface, a weight member having a plane surface, a coupling member having a plane surface, means for attaching said plane surface of said weight member to one of said parallel plane surfaces of said transducer means, means for attaching the opposite parallel plane surface of said transducer means to the plane surface of said coupling means, fastening means for securing said assembled weight member, transducer means and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, said coupling member having a plane surface on one side which comes in contact with the transducer means, and further characterized in that the opposite side of said coupling member comprises a circular line edge which makes contact with the plane surface of said vibratile diaphragm.

8. The invention set forth in claim 7, further characterized in that the coupling member is of a material which is harder than the material of the vibratile diaphragm.

9. In combination in an electroacoustic transducer, transducer means having a pair of opposite parallel plane surfaces, electrical conductor means connected to said transducer, said transducer means characterized in that alternating current applied to said conductor means establishes mechanical vibrations in said transducer means at right angles to said parallel plane surfaces, a vibratile diaphragm having a plane surface, a weight member having a plane surface, a coupling member having a plane surface, means for attaching said plane surface of said weight member to one of said parallel plane surfaces of said transducer means, means for attaching the opposite parallel plane surface of said transducer means to the plane surface of said coupling means, fastening means for securing said assembled weight member, transducer means and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, said coupling member having a plane surface on one side which is in contact with said transducer means, and a plane parallel annular surface on the opposite side which is in contact with the plane surface of said vibratile diaphragm, and further characterized in that said coupling member has reduced cross-sectional area in the region between said opposite parallel plane surfaces.

10. In combination in an electroacoustic transducer capable of operating under water, electromechanical transducer means having first and second spaced-apart parallel plane surfaces, electrical conductor means connected to said transducer means for applying an alternating current to set the transducer means into vibration, a housing structure defining an enclosure for said transducer means, a vibratile rigid diaphragm having a plane surface, a flexible gasket bonded between the peripheral portion of said plane surface of said vibratile diaphragm and said housing structure to effect a watertight seal within the enclosure defined by the housing structure and said vibratile rigid diaphragm, coupling means having a first plane surface rigidly attached to said first parallel plane surface of said electromechanical transducer means, a weight member secured to said second parallel plane surface of said electromechanical transducer means, fastening means for securing said assembly of weight member, transducer means, and coupling means to the plane surface of said vibratile diaphragm, said coupling means characterized in that axial vibratory oscillations generated by said transduced means are efficiently transmitted to the vibratile rigid diaphragm, and further characterized in that flexural vibrations of the rigid diaphragm, such as occur by bending of the rigid diaphragm surface when exposed to intense shock waves, are not efficiently transmitted to the transducer means.

11. The invention set forth in claim 10 characterized in that the resonant frequency of the housing structure, in combination with the compliance of said flexible gasket, occurs at a frequency below the resonant frequency of the vibratile rigid diaphragm in combination with the assembled transducer means and weight member.

12. In combination in an electroacoustic transducer capable of operating under water, electromechanical transducer means having first and second spaced-apart parallel plane surfaces, electrical conductor means connected to said transducer means for applying an alternating current to set the transducer means into vibration, a housing structure defining an enclosure for said transducer means, a vibratile plate having a plane surface, a flexible gasket bonded between the peripheral portion of said plane surface of said vibratile diaphragm and said housing structure to effect a watertight seal within the enclosure defined by the housing structure and said vibratile plate, coupling means having a first plane surface rigidly attached to said first parallel plane surface of said electromechanical transducer means, a weight member secured to said second parallel plane surface of said electromechanical transducer means, fastening means for securing said assembly of weight member, transducer means and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, said fastening means applying a compressive force to the assembled elements which is greater than the peak oscillatory force generated by said electromechanical transducer means when said electroacoustic transducer is operating at maximum power.

13. In combination in an electroacoustic transducer capable of operating under water, electromechanical transducer means having first and second spaced-apart parallel plane surfaces, electrical conductor means connected to said transducer means for applying an alternating current to set the transducer means into vibration, a housing structure defining an enclosure for said transducer means, a vibratile plate having a plane surface, a flexible gasket bonded between the peripheral portion of said plane surface of said vibratile diaphragm and said housing structure to effect a watertight seal within the enclosure defined by the housing structure and said vibratile plate, coupling means having a first plane surface rigidly attached to said first parallel plane surface of said electromechanical transducer means, a weight member secured to said second parallel plane surface of said electromechanical transducer means, fastening means for securing said assembly of weight member, transducer means, and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, said coupling means having a thin circular line edge projection opposite its plane surface, and said circular line edge making contact to the plane surface of said vibratile diaphragm.

14. The invention set forth in claim 13 further characterized in that said coupling means is of a material which is harder than the material of the vibratile diaphragm.

15. In combination in an electroacoustic transducer capable of operating under water, electromechanical transducer means having first and second spaced-apart parallel plane surfaces, electrical conductor means connected to said transducer means for applying an alternating current to set the transducer means into vibration, a housing structure defining an enclosure for said transducer means, a vibratile plate having a plane surface, a flexible gasket bonded between the peripheral portion of said plane surface of said vibratile diaphragm and said housing structure to effect a watertight seal within the enclosure defined by the housing structure and said vibratile plate, coupling means having a first plane surface rigidly attached to said first parallel plane surface of said electromechanical transducer means, a weight member secured to said second parallel plane surface of said electromechanical transducer means, fastening means for securing said assembly of weight member, transducer means, and coupling means to the plane surface of said vibratile diaphragm, said coupling means characterized in that axial vibratory oscillations generated by said transducer means are efficiently transmitted to the vibratile diaphragm, and further characterized in that flexural vibrations of the diaphragm, such as occur by bending of the diaphragm surface when exposed to intense shock waves, are not efficiently transmitted to the transducer means, said coupling means having a plane surface on one side which is in contact with said transducer means and a parallel plane annular surface on the opposite side which is in contact with the plane surface of said vibratile diaphragm, and further characterized in that said coupling member has reduced cross-sectional area in the region between said opposite parallel plane surfaces.

References Cited

UNITED STATES PATENTS

| | | | |
|---|---|---|---|
| 2,939,106 | 5/1960 | Mason | 340—10 |
| 3,094,636 | 6/1963 | Gauld | 340—10 X |
| 3,281,769 | 10/1966 | Hueter | 340—10 X |
| 3,284,761 | 11/1966 | Douglas | 340—10 |

RODNEY D. BENNETT, Jr., Primary Examiner

B. L. RIBANDO, Assistant Examiner

U.S. Cl. X.R.

340—10